United States Patent [19]

Ando

[11] 4,432,002
[45] Feb. 14, 1984

[54] DATA RECORDING MEDIUM AND MANUFACTURING METHOD THEREFOR

[75] Inventor: Hideo Ando, Tokyo, Japan

[73] Assignee: Tokyo Shibaura Denki Kabushiki Kaisha, Kawasaki, Japan

[21] Appl. No.: 309,102

[22] Filed: Oct. 6, 1981

[30] Foreign Application Priority Data

Oct. 9, 1980 [JP] Japan .................................. 55-141720

[51] Int. Cl.³ .............................................. G01D 15/32
[52] U.S. Cl. .................................. 346/135.1; 346/76 L
[58] Field of Search ........................... 346/135.1, 76 L

[56] References Cited

U.S. PATENT DOCUMENTS 3,665,483 5/1972 Becker et al. ...................... 346/135

4,264,911 4/1981 Wilkinson ......................... 346/135.1

Primary Examiner—E. A. Goldberg
Assistant Examiner—D. Jennings
Attorney, Agent, or Firm—Cushman, Darby & Cushman

[57] ABSTRACT

A data recording medium comprises two disc-shaped substrates opposing each other at a distance; a pair of radiation-sensitive recording layers, each of which is formed on part of an opposing surface of each of the substrates and which oppose each other at a distance; and an interlayer with a low reflectivity which fills a space defined by the recording layers and which is bonded to the recording layers. Optical data may be recorded on a record or read out from the record by focusing a laser beam on the recording layers.

6 Claims, 4 Drawing Figures

DATA RECORDING MEDIUM AND MANUFACTURING METHOD THEREFOR

BACKGROUND OF THE INVENTION

The present invention relates to a data recording medium on which optical data may be recorded, for example, by focusing a laser beam on a radiation-sensitive recording layer to form a pit in the recording layer and from which the recorded optical data may be read out; and to a manufacturing method therefor.

A conventional data recording medium of this type (to be referred to as a record for brevity hereinafter) has, as shown in FIG. 1, a pair of disc-shaped transparent substrates 2 opposing each other with a spacer 1 interposed therebetween, and radiation-sensitive recording layers 3 each formed on the opposing surface of these substrates. A record of this construction has a space 4 between the recording layers 3 and has a weak mechanical strength. Therefore, the substrates 2 may be easily indented by an external mechanical pressure. When the record is left to stand obliquely, the record may bend by its own weight. When the record is transported to a place where the temperature difference is great, the air within the space expands or contracts and the substrates may be deformed due to the temperature difference between the space 4 and the outer atmosphere. The undulations or deflections thus formed result in a change in a spot size of the laser beam which becomes incident on the recording layer 3, and the data may not be written or read out satisfactorily. When a record is transferred from a place at high temperature and humidity to a place at low temperature, condensate forms within the space 4 and becomes attached to the recording layer, thus degrading the recording layer 3 at an early stage.

Also, where the substrate 2 is formed of a plastic material, water in the atmosphere permeates into the plastic substrate because a plastic material is high in water permeability. Thus, the water is attached to the recording layer 3, leading to deterioration of the recording layer in a short time.

SUMMARY OF THE INVENTION

It is an object of the present invention to provide a data recording medium which is not complex in structure, has a high strength against external mechanical pressure, is free from undulations, deflections and the degradation of the recording layer by air or water at an early stage, and is capable of performing stable data processing for a long period of time; and also to provide a manufacturing method therefor.

According to an aspect of the present invention, there is provided a data recording medium comprising:

two disc-shaped substrates opposing each other at a distance;

a pair of radiation-sensitive recording layers, each of which is formed on part of an opposing surface of each of said substrates and which oppose each other at a distance; and an interlayer with a low reflectivity which fills a space defined by said recording layers and which is bonded to said recording layers. The interlayer preferably comprises an epoxy resin.

According to another aspect of the present invention, there is provided a method for manufacturing a data recording medium comprising the steps of:

forming two disc-shaped substrates each having a radiation-sensitive layer on part of a surface thereof;

forming an interlayer with a low reflectivity and a high adhesion strength which is of sufficient thickness to bury said recording layers on the surface of each of said substrates; and opposing said interlayers in contact with each other and bonding said interlayers to said substrates.

DETAILED DESCRIPTION OF THE PREFERRED EMBODIMENTS

Figure 1:
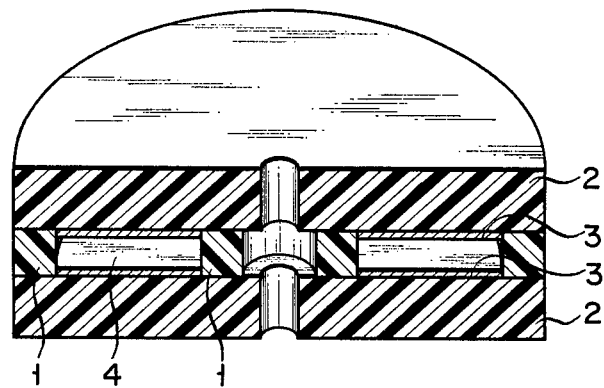
FIG. 1 is a sectional view of a conventional data recording medium.
Figure 2:
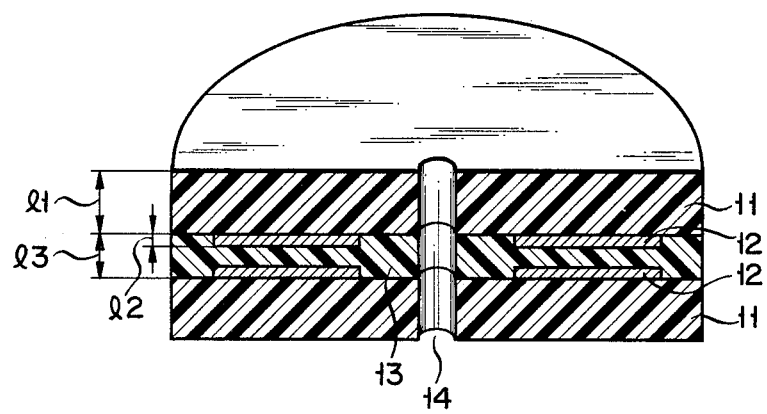
FIG. 2 is a sectional view of an embodiment of a data recording medium according to the present invention.

The preferred embodiment of the data recording medium of the present invention will now be described with reference to FIG. 2. Referring to FIG. 2, reference numeral 11 denotes a pair of transparent disc-shaped substrates which oppose each other at a distance. An annular recording layer 12 of Te is formed on the opposing surface of each of these substrates 11 so as to oppose each other at a distance. An interlayer 13 with low reflectivity and consisting mainly of an epoxy resin is formed to completely fill the space defined by the substrates 11 and the recording layers 12. The interlayer 13 is formed integrally with the substrates 11 and the recording layers 12. A spindle hole 14 extends through the center of the substrates 11 and the interlayer 13.

In the data recording medium of this structure, since the recording layer 12 is not formed over the entire opposing surface of the substrate 11, the interlayer 13 directly contacts with a sufficient surface area of the substrates 11 to maintain a sufficient adhesion strength between the two substrates 11. Even if the adhesion strength between the recording layer 12 and the substrate 11 is insufficient, the recording layer 12 may not be separated from the substrate 11 since the recording layer 12 is in contact with the interlayer 13 throughout its periphery. The thickness l1 of the substrate 11 is preferably 0.3 mm or more so that the writing or reading out of data may not be hindered when dust is deposited on the surface of the substrate. However, the thickness l1 is more preferably 5 mm or less so as to focus the laser beam by means of a lens. The thickness l2 of the recording layer 12 and the thickness l3 of the interlayer 13 are not particularly limited. However, if the thickness l2 is 500 Å, the thickness l3 is selected to be within the range of 14 to 40 μm.

Figure 3:
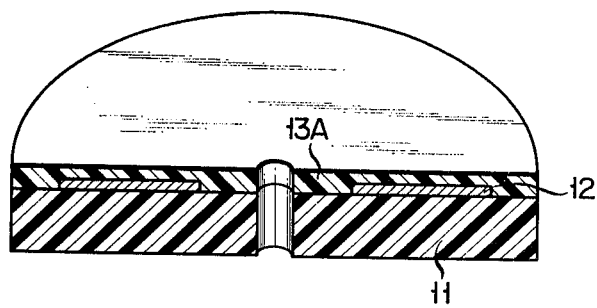
FIG. 3 is a sectional view of a laminate body as a constituting member of the data recording medium of the present invention.
Figure 4:
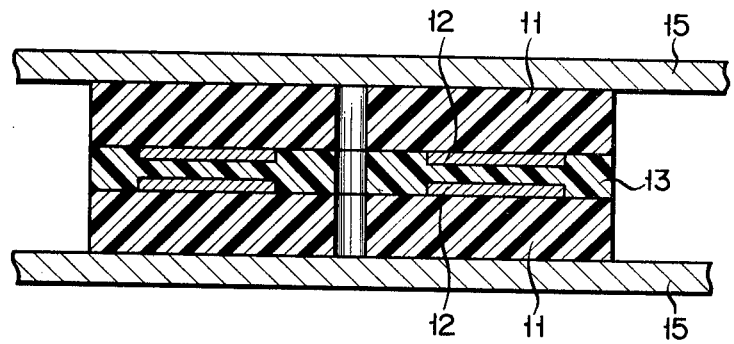
FIG. 4 is a sectional view showing the manner according to which two laminate bodies as shown in FIG. 3 are prepared and bonded to each other.

The method for manufacturing the record of the structure shown in FIG. 2 will now be described with reference to FIGS. 3 and 4. First, as shown in FIG. 3, the Te film (recording layer) 12 is uniformly formed by vacuum deposition to a thickness of 500 Å on part of one surface of the transparent substrate 11 of acrylic resin. However, the Te film 12 may be formed by other means such as sputtering.

A composition is prepared which consists of an epoxy resin, a polyamide as a curing agent, and 10 to 20% of phenyl glycidyl ether as a diluent. This composition is uniformly spread to a thickness of 7 to 20 μm using a spinner on the surface of the substrate 11, including the recording layer 12, to form a coating layer 13A. A laminate body of the structure as shown in FIG. 3 is thus obtained. By following the same procedure, another laminate body is prepared. Before the coating layers 13A of the two laminated bodies are cured, they are opposed to each other and bonded. A record of the structure as shown in FIG. 2 is obtained which has the interlayer 13 consisting of bonded coating layers 13A. In order to maintain the parallel relationship of the two substrates 11, it is preferable to use, when bonding the coating layers 13A, two parallel press plates 15 to press the substrates 11 from the outside, as shown in FIG. 4, until the coating layers 13A are completely cured.

In the method described above, the coating layers are opposed each other to bond them before the coating layers 13A are cured. However, the present invention is not limited to this. Thus, it is also possible, after the coating layers 13A are completely cured, to coat an adhesive by a spinner on one or both of the coating layers of the laminate bodies, or to coat with a spinner a solvent which is capable of dissolving the epoxy resin of the coating layer. Then, the coating layers 13A may be bonded by an adhesive layer thus formed. According to this method, the coating layers 13A before curing may not leak out when bonding them, so that the recording layers 12 may not be adversely affected. An adhesive comprising silicone resin, rubber or the like instead of an adhesive of an epoxy resin may be adopted as an adhesive for bonding the coating layers 13A. Furthermore, in the embodiment described above, the substrates 11 of the same material, thickness, and outer diameter are used for the purpose of simplifying the manufacturing method. However, the present invention is not limited this.

With the data recording medium of the present invention thus manufactured, the writing sensitivity by an He-Ne laser of 8 mW and 500 mS (beam diameter; 1 μm) was measured. The sufficient modulation of signals was observed. When the surface of the interlayer 13 was observed with a microscope, surface roughness was not noted. Therefore, it was found that the interlayer 13 does not impair formation of pits in the recording layer 12. When the formed pit was optically read out, no generation of noise or degradation in the S/N ratio were observed. When the writing sensitivity by an He-Ne laser beam of 8 mW and 500 mS was measured on a record with the interlayer 13 comprising a polystyrene instead of the record with the interlayer 13 of an epoxy resin, the sufficient modulation of signals was observed.

In the embodiment described above, the interlayer 13 comprises an epoxy resin or a polystyrene resin. However, according to the present invention, the interlayer 13 may comprise a thermosetting resin such as a melamine resin, or a thermoplastic resin such as a polycarbonate resin and a methacrylate resin.

What is claimed is:

1. A data recording medium comprising:
   two disc-shaped substrates of 0.3 millimeter to 5 millimeter in thickness opposing each other at a distance;
   a pair of radiation-sensitive recording layers, each of which is formed on part of an opposing surface of each of said substrates and which oppose each other at a distance; and
   an interlayer with a low reflectivity which fills a space defined between said recording layers and the space defined between parts of said substrates not covered by said recording layer so that said interlayer is bonded to said recording layers and to said substrates.

2. A data recording medium according to claim 1, wherein said interlayer comprises an eposy resin.

3. A data recording medium according to claim 1, wherein said interlayer comprises a polystyrene resin.

4. A method for manufacturing a data recording medium comprising the steps of:
   forming two disc-shaped substrates of 0.3 millimeter to 5 millimeter in thickness each having a radiation-sensitive recording layer on part of a surface thereof;
   forming on each of said recording layers and on surfaces of said substrates not covered by said recording layers an interlayer with a low reflectivity and a high adhesion strength which is of sufficient thickness to bury said recording layers on the surface of each of said substrates; and
   opposing said interlayers in contact with each other and bonding said interlayers to each other.

5. A method according to claim 4, wherein an adhesive is coated on the surfaces of said interlayers after said interlayers are cured and not adherable, and said interlayers are bonded through the adhesive.

6. A method according to claim 4 or 5, wherein said substrates are clamped from the outside by press plates when bonding said interlayers.

* * * * *